Figure 1:
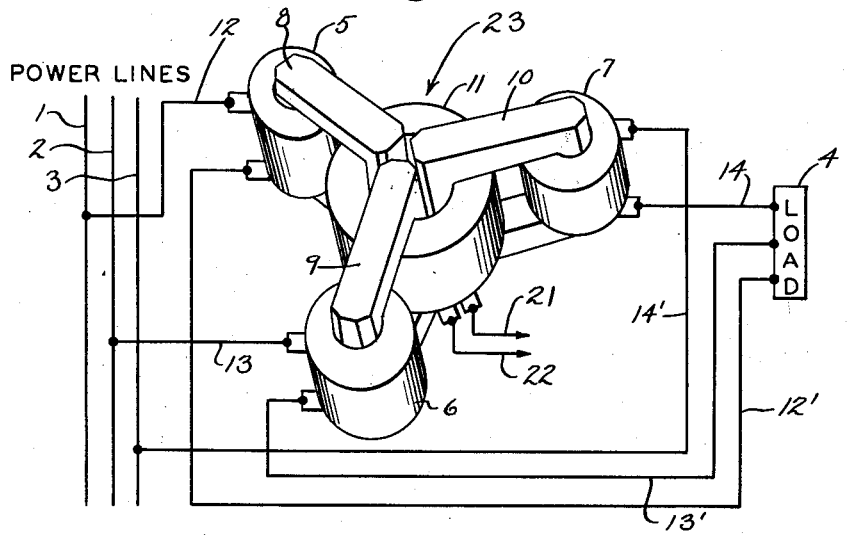

INVENTORS
WOLFGANG E. KNIEL
ALBERT A. ZAFFRANN, JR.

ATTORNEYS

Feb. 18, 1964 W. E. KNIEL ETAL 3,121,826
PHASE FAILURE PROTECTIVE CIRCUIT
Filed May 19, 1958 3 Sheets-Sheet 3
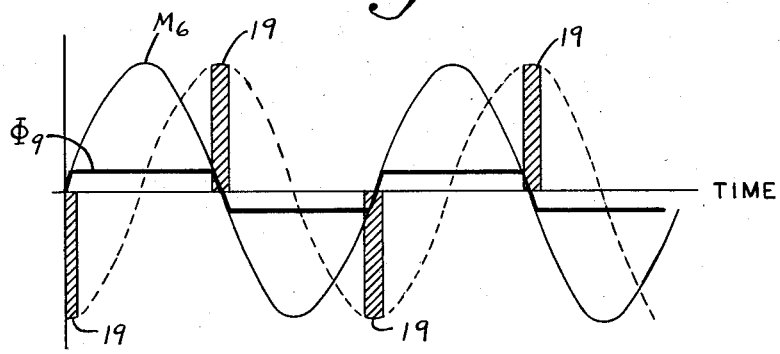
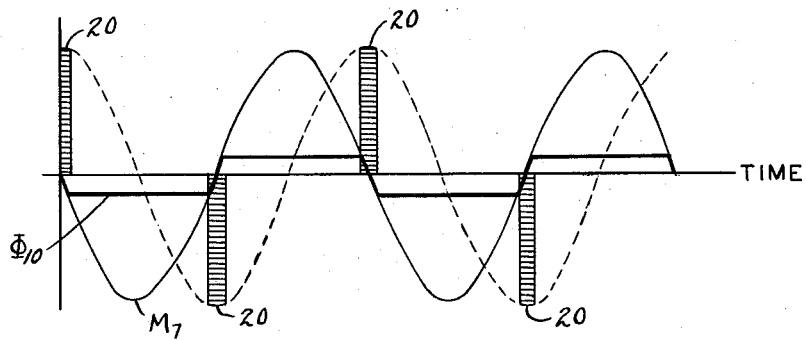
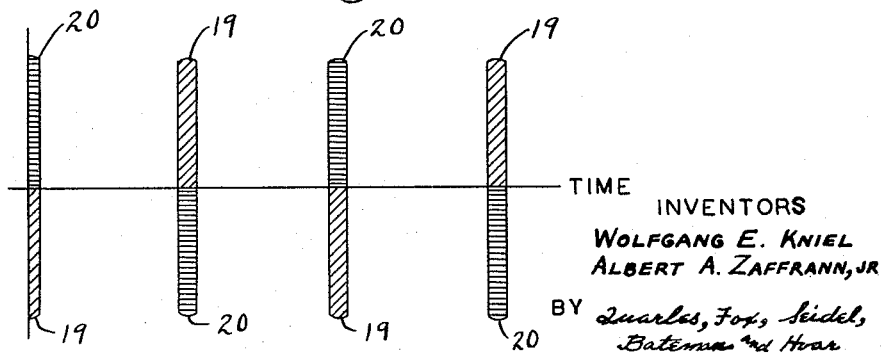
INVENTORS
WOLFGANG E. KNIEL
ALBERT A. ZAFFRANN, JR
BY Quarles, Fox, Seidel,
Bateman and Hoar
ATTORNEYS

United States Patent Office 3,121,826
Patented Feb. 18, 1964

3,121,826
PHASE FAILURE PROTECTIVE CIRCUIT
Wolfgang E. Kniel, Bayside, and Albert A. Zaffrann, Jr., Milwaukee, Wis., assignors to Allen-Bradley Company, Milwaukee, Wis., a corporation of Wisconsin
Filed May 19, 1958, Ser. No. 736,165
2 Claims. (Cl. 317—27)

This invention relates to circuits for phase failure protection and it more particularly resides in a phase failure protective device having a transformer with a plurality of primary windings to be connected in the lines of a polyphase source and a common secondary winding magnetically linked with each of the primary windings, the secondary winding being joined through a series resonant circuit to a rectifier that supplies a signal to a sensing relay, which signal will be insufficient to energize the relay in the event one of the polyphase lines is open, to thereby provide a means for disconnecting associated equipment from the source in the event of a phase failure.

A phase failure protector of the type which this invention improves upon is described in U.S. Letters Patent No. 2,938,150, issued May 24, 1960. The apparatus therein described has a current transformer with three primary windings which are each adapted to be connected in one phase of a three phase system to thereby conduct a phase current. Each primary winding has a magnetic core, and each core is linked with a common secondary winding, whereby the voltage induced in the secondary winding is the sum of three voltages separately induced by the three primary windings. The magnetic characteristics of the cores are appropriately selected, and when the three phases are balanced and symmetrical the frequency of the induced secondary voltage is three times that of the source supplying the primary windings, and if one phase should open the net induced voltage in the secondary winding will sharply decrease.

The secondary winding described in said copending application is connected through a rectifier to a direct current sensing relay, the function of the relay being to detect significant changes in voltage output of the secondary winding whenever a phase failure occurs. Upon a significant decrease in the voltage the relay will function to disconnect associated equipment from the polyphase power source, and thereby protect such equipment from overload currents in the event of a phase failure.

While the frequency of the induced voltage in the secondary winding is three times that of the three phase power source, and therefore 180 cycles per second in the instance of a 60 cycle source, it is nevertheless desirable to smooth out the current flow in the circuit of the secondary winding to thereby present a more uniform current to the sensing relay. More reliable response will then be assured. Heretofore a capacitor has been connected in shunt with the secondary winding to provide a parallel resonant circuit to modify the current wave. An inherent weakness of such a circuit arrangement, and which the present invention is designed to improve upon, is that due to the saturable characteristics of the magnetic cores linking the secondary winding the inductance of the winding varies during each cycle thereby making it difficult, if at all possible, to accurately tune the capacitor and the secondary winding for resonance resulting in a significant reduction in the current flowing to the sensing relay.

Further, in prior art constructions it was heretofore necessary to insert a compensating resistor in series connection with the rectifying means and sensing relay for the purpose of limiting abnormally high peak voltages appearing in the secondary winding as a result of inherent variations in the saturation characteristics of the cores employed in the multiple primary transformer. While such high voltages must necessarily be shielded from the rectifiers, the undesirable effect of the presence of such a compensating resistor is to appreciably reduce the current available at any instant of time for the operation of the sensing relay.

Another prevailing criticism of prior art phase failure protectors is that such devices are customarily capable of providing protection over only a very narrow current range. Consequently, for each application of a protector to various sizes and types of equipment, it is necessary to redesign the protector according to the current demands of the load. While the apparatus described in my copending application, previously referred to, made a major advance in the application of a single unit to a wide range of currents, the broadest range of protection is only possible, however, when the multiple primary transformer cores are carefully selected and matched, and when the compensating resistor is critically adjusted for optimum passage of current. In actual commercial production such careful selection and adjustment of components may be economically infeasible.

An object of the present invention is to provide means for smoothing and filtering the current flow in the circuit of the secondary winding by tuned series resonant components independent of the inductance of the secondary winding.

It is another object of this invention to provide rectifier connections between a secondary winding as described and a direct-current sensing relay which enable the rectifiers to withstand normally high applied voltages, and which make it feasible to employ small-sized unmatched rectifiers while maintaining efficient and dependable operation.

It is another object of this invention to provide a sensing circuit for a phase failure protector in which abnormal peak voltages are absorbed by the tuned series resonant components without an appreciable reduction in the effective current available to actuate the sensing relay.

It is therefore an object of this invention to provide an improved phase failure protector capable of affording protection to various types of equipment over current ranges heretofore unknown.

It is a further object of this invention to provide protection over a wide range of currents by means of a protector embodying commercialy available average run components whereby the necessity for careful preselection and matching of components is eliminated.

The foregoing and other objects and advantages of this invention will appear from the following description, and the accompanying drawings which form a part hereof. The drawings are for purposes of illustration and are not to be construed as defining the scope or limits of the invention, reference being had for the latter purpose to the appended claims.

Figure 2:
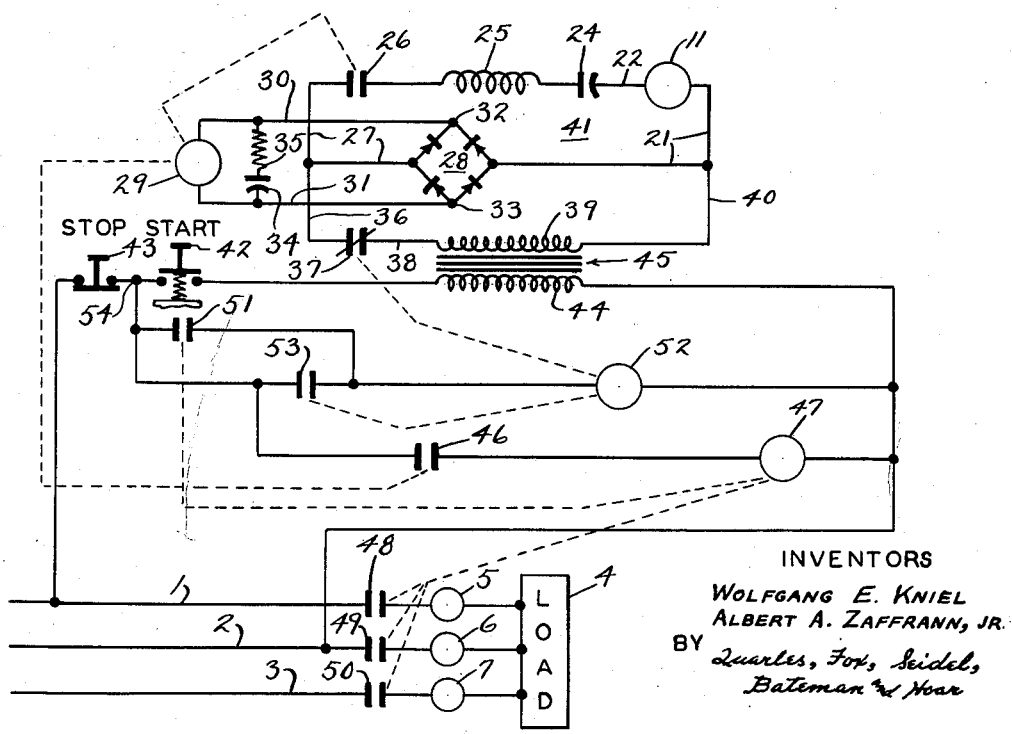
Figure 4:
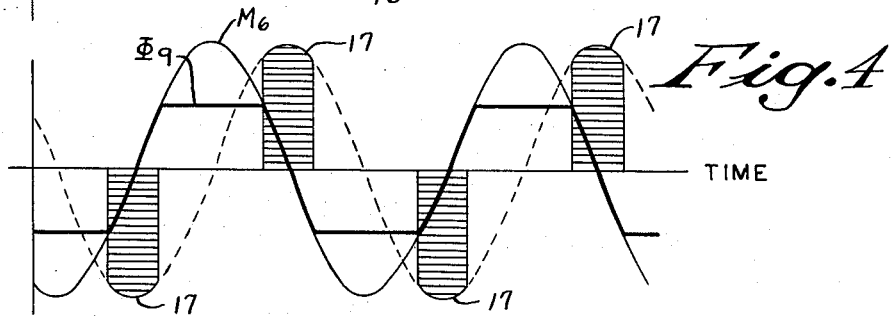
Figure 5:
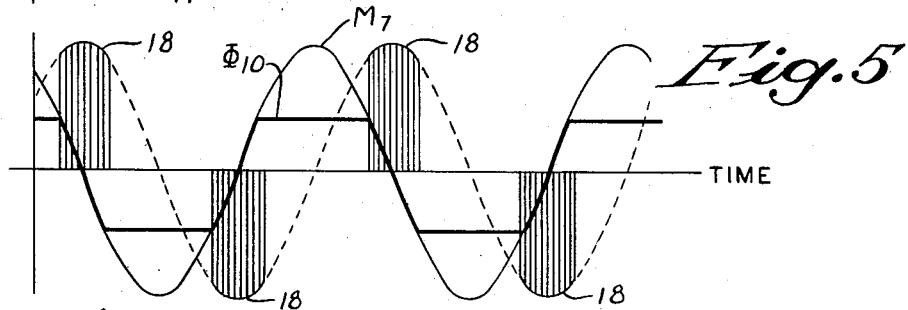
Figure 6:
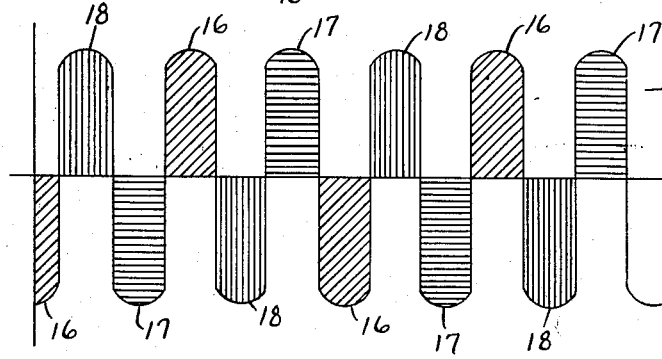

In the drawings:

FIG. 1 is a view in perspective of a current transformer as forms a part of a circuit in which the invention may be embodied, FIG. 2 is a schematic wiring diagram of a phase failure protective circuit embodying the invention and also incorporating a current transformer as shown in FIG. 1, FIGS. 3, 4 and 5 are curves illustrating the magnetomotive force produced by balanced and symmetrical three phase source currents in each primary winding of the transformer of FIG. 1 together with flux produced thereby and voltages induced in the secondary winding, FIG. 6 is a curve illustrating the total voltage induced in the secondary winding of the transformer of FIG. 1 by the flux shown in FIGS. 3, 4 and 5, FIGS. 7 and 8 are curves depicting the magnetomotive forces, flux produced thereby, and induced voltage in the secondary winding when one phase of a three phase supply for the transformer of FIG. 1 is interrupted, and FIG. 9 is a curve illustrating the total voltage induced in the secondary winding by the flux represented in FIGS. 7 and 8.

Referring now to FIG. 1, there is shown a set of polyphase power lines 1, 2 and 3 connected to a load 4 through primary windings 5, 6 and 7 of a current transformer 23. For purposes of illustration and explanation of the operation of the transformer 23, the three windings 5, 6 and 7 are shown as being directly connected at one side to the power lines 1, 2 and 3, without interposed switch contacts as shown in FIG. 2, by means of conductors 12, 13 and 14 respectively, and at the other side to load 4 by means of conductors 12', 13' and 14' respectively. Each of the primary windings 5, 6 and 7 encircles an outer leg of one of three closed magnetic cores 8, 9 and 10, respectively, and a single secondary winding 11 is arranged to encircle a central leg of each of the cores 8, 9 and 10. Thus, the secondary winding 11 is linked magnetically with each primary winding 5, 6, 7 to have voltages induced therein in response to primary winding currents. Conductors 21 and 22 extend from the secondary winding 11 for connection in a sensing circuit as hereinafter described.

The structure and operation of the transformer 23 are discussed in detail in said copending applicaton, Serial No. 608,886. Such operation may now be briefly summarized for the purpose of setting forth the environment in which the present invention resides.

Figure 3:
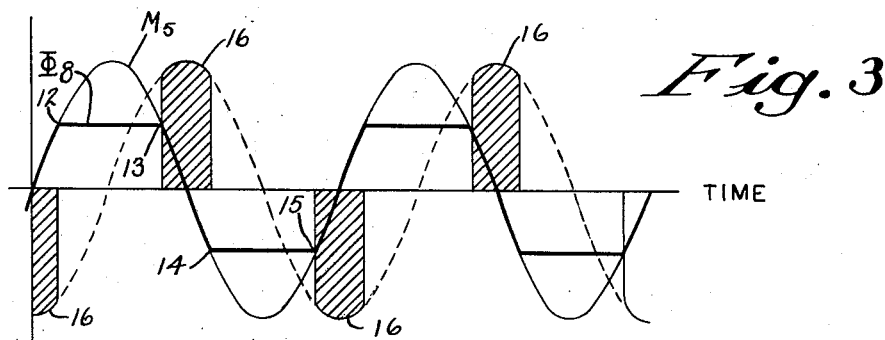

When balanced and symmetrical polyphase currents flow from the power lines 1, 2 and 3 to the load 4 corresponding alternating magnetomotive forces are presented by the primary windings 5, 6 and 7. The magnetomotive force produced in winding 5 is represented in FIG. 3 by the curve $M_5$, which curve is, of course, also representative of the current in the winding. The magnetomotive forces produced in windings 6 and 7 are shown in FIGS. 4 and 5 by curves designated $M_6$ and $M_7$, respectively. The corresponding fluxes produce in the cores 8, 9 and 10 by these magnetomotive forces in the primary windings 5, 6 and 7 are designated in FIGS. 3, 4 and 5 as $\phi_8$, $\phi_9$ and $\phi_{10}$, respectively. Referring to FIG. 3, and commencing at the left, it can be seen that the flux curve $\phi_8$, increases as the magnetomotive force $M_5$ increases during its positive half cycle until the point 12 is reached, at which time saturation of the core 8 occurs. The core 8 then continues in a saturated condition with a substantially constant flux value during the period of further increase in magnetomotive force and until the magnetomotive force decreases to the point 13, after which time the flux $\phi_8$ decreases along with the magnetomotive force. During the following negative half cycle a similar change in flux occurs, with saturation existing between points 14 and 15. Similarly, in FIGS. 4 and 5 it can be seen that the flux curves $\phi_9$ and $\phi_{10}$ correspond to the curves of the magnetomotive forces $M_6$ and $M_7$ except during those periods of time when the cores 9 and 10 are saturated. It is desirable that the transition from the unsaturated to the saturated condition in the cores 8-10 be abrupt, and for this purpose a magnetic material with a substantially square hysterisis curve is preferably selected for the three transformer cores 8, 9 and 10.

Since voltages induced in the secondary winding 11 are dependent upon the rate of change of the flux in the cores 8, 9 and 10, it is apparent that transformer action in each core is limited to the time intervals when there is no saturation. In FIG. 3, the resulting discontinuous voltage surges induced in the secondary winding 11, due to the changing flux in core 8, are represented by the numeral 16. Similarly, in FIGS. 4 and 5 the voltages induced in the secondary winding 11 due to the changing flux in cores 9 and 10 are indicated by the numerals 17 and 18 respectively. The cores 8, 9 and 10 are preferably dimensioned to saturate at about thirty electrical degrees when minimum load currents to be handled are flowing through the primary windings 5, 6 and 7. By this it is meant that in a complete 360 degree cycle of current each core will be saturated between 30 degrees and 150 degrees and again between 210 degrees and 330 degrees of its particular current cycle. Under such conditions the duration of each of the voltage surges induced in the secondary winding 11 is sixty electrical degrees corresponding to the time interval between saturation of the respective cores 8, 9 and 10.

FIG. 6 illustrates the total voltage induced in the secondary winding 11 when the load currents to be handled are at a minimum value, which voltage consists of a continuous series of alternate positive and negative voltage surges, each of which has a duration of 60 electrical degrees. The frequency is three times that of the primary winding currents. Hence, the frequency of the secondary winding voltage is 180 cycles for a 60 cycle power source.

In the event of a failure in one of the power lines 1, 2 or 3 supplying the load 4 the total voltage induced in the secondary winding 11 will either be drastically reduced or entirely eliminated. Illustrative of a situation in which the secondary winding voltage is entirely eliminated, an interruption in power line 1 will be assumed in which the sole remaining phase voltage will be that between power lines 2 and 3. The occurrence of such a failure in power line 1 results in "single phasing" of the load thereby causing the current in line 2 and primary winding 6 to be 180 degrees out of phase with the current in line 3 and primary winding 7. The magnetomotive forces produced in primary coils 6 and 7 under such conditions are shown in FIGS. 7 and 8, and are again designated $M_6$ and $M_7$, respectively. Further, the curves of the associated core fluxes produced by those magnetomotive forces are illustrated in FIGS. 7 and 8, and are designated $\phi_9$ and $\phi_{10}$ which are the fluxes in cores 9 and 10, respectively. It may be observed that the cores now reach the point of saturation well in advance of thirty electrical degrees, the reason for this being that the currents flowing in the power lines 2 and 3 have increased in magnitude due to the heavier burden placed on the single operating phase. As a result the flux in each core now changes in value only during brief intervals of time and the resulting induced voltage surges 19 and 20 in the secondary winding 11 are of much shorter duration, than when each of the phases is operating properly. The total voltage induced in the secondary winding 11 is illustrated in FIG. 9, wherein the induced voltage surges 19 and 20 are observed to be 180 degrees out of phase. The net effect is one of cancellation, such that the total voltage induced in the secondary winding 11 when the power line 1 is interrupted is zero. A similar result is achieved when either power line 2 or 3 is interrupted under similar conditions. Thus, when the source currents are balanced and symmetrical the net voltage output of the secondary winding 11 is substantial, whereas after one line is interrupted the net voltage output is substantially reduced or entirely eliminated.

Referring now to the wiring diagram of FIG. 2, the secondary winding 11 shown in diagrammatic form is connected in series with the lead 22, a capacitor 24, a variable inductor 25, normally open sensing relay contacts 26, a conductor 27, a bridge rectifier 28, and the conductor 21 to form a closed loop sensing circuit 41. A sensing relay coil 29 which operates the contacts 26 and a second set of sensing relay contacts 46 is connected through leads 30 and 31 to the output terminals of the rectifier 28. A time delay circuit consisting of a capacitor 34 and a resistor 35 is joined between the conductors 30 and 31 to be in parallel with the sensing relay coil 29. Connected to the input of the rectifier 28 is an initiating circuit consisting of a conductor 36, normally closed relay contacts 37, a conductor 38, a transformer secondary winding 39 of a transformer 45, and a conductor 40. A primary winding 44 of transformer 45 is joined between power lines 1 and 2 through a normally closed stop push button 43 and a normally open start push button 42. Also joined at one side to power line 2 is a reset relay coil 52 which is connected at its other side through self-holding normally open contacts 53 to a common terminal 54 of the start push button 42 and the stop push button 43. In addition to the self-holding contacts 53, there is associated with the reset relay coil 52 normally closed relay contacts 37 which are hereinbefore described. Additionally connected at one side to the power line 2 is a line contactor coil 47 which has its other side connected through normally open contacts 46, associated with sensing relay 29, to the terminal 54. Associated with the contactor coil 47 are contacts 51 connected in shunt with contacts 53, and also power line contacts 48, 49 and 50 interposed in power lines 1, 2 and 3, respectively, in advance of the primary windings 5, 6 and 7 shown in diagrammatic form in FIG. 2.

The operation of the circuit illustrated in FIG. 2 is as follows:

When the normally open start button 42 is depressed and stop button 43 is in closed position, a voltage appearing across lines 1 and 2 is impressed upon the primary winding 44 of transformer 45 which in turn induces a voltage in the secondary winding 39. This induced voltage causes a current to flow through the conductor 38, the normally closed contacts 37, conductors 36 and 27, the bridge rectifier 28, the sensing relay coil 29, and conductors 21 and 40, to thereby initially energize the coil 29 and close its associated normally open contacts 26 as well as normally open contacts 46. When the latter contacts 46 are closed, line contactor coil 47 connected between power lines 1 and 2 is energized, which in turn operates to close the associated line contacts 48, 49 and 50, to thereby allow current to flow from the source lines 1, 2 and 3 to the load 4 through the primary current coils 5, 6 and 7, as previously discussed. Further, when line contactor coil 47 is energized, associated contacts 51 are moved into closed position thereby energizing reset relay coil 52 by connecting it across source lines 1 and 2. The energization of reset coil 52 closes normally open contacts 53, which act as self-holding contacts for coil 52 to maintain the energization of coil 52 independent of contacts 51. The energization of coil 52 also opens the normally closed contacts 37 which removes the initiating voltage appearing across secondary winding 39 from the sensing coil 29.

The opening of normally closed contacts 37 and the closing of contacts 26, as previously discussed, causes the sensing circuit 41 to be singularly dependent on the voltage induced in the secondary winding 11, which voltage is induced, as heretofore described, by reason of the current flowing in the primary windings 5, 6 and 7 subsequent to the closing of contacts 48, 49 and 50 in power lines 1, 2 and 3, respectively.

When balanced and symmetrical currents are flowing in the source lines 1, 2 and 3 the voltage output of the secondary coil 11 will contain a third harmonic of the source frequency, as indicated previously. In order to circulate maximum effective current through the sensing circuit from the secondary coil 11 it is desired to suitably adjust the inductance of the variable inductor 25 according to the fixed capacitance of the capacitor 24 so as to establish electrical resonance at a frequency such as a third harmonic of the source frequency which is dominant in the output of the secondary coil 11. The inductor 25 and capacitor 24 thus comprise a series resonant filter presenting a minimum impedance to the passage of harmonic currents while simultaneously smoothing the current wave. The inductor 25 is preferably of the type having a magnetic core and a variable air gap therein, whereby its inductance may be varied by mechanically increasing or decreasing the length of the air gap. The inductor is further selected to be of sufficient impedance so as to absorb abnormally high voltage surges that may appear in the circuit due to inherent variations in the magnetic properties of the cores 8, 9 and 10.

A full-wave bridge rectifying means 28 is employed in the circuit to permit the passage of maximum unimpeded current directly from the tuned capacitor 24 and inductor 25 to the D.C. sensing relay coil 29.

The resistor 35 and capacitor 34 are employed for the purpose of providing a time delay whereby the effects of unbalanced transient starting currents and the like, which persist for only a brief period of time, will not affect the energization of the sensing coil 29, and also for the purpose of smoothing the D.C. current flowing through the sensing coil 29.

From the foregoing discussion it will be apparent that the sensing circuit 41 is adapted for effective utilization of the current output of the secondary coil 11. When the inductor 25 and capacitor 24 are properly tuned, current flow through the sensing coil 29 will be limited only by the inherent resistance in the components, comprising the circuit 41, and the self inductance of the secondary coil 11 and the relay coil 29. Thus, by increasing the current available to the sensing relay, the apparatus is characterized by its ability to expand the current range of such phase failure protectors considerably in excess of that heretofore deemed possible.

It is understood that various changes in the type, size and arrangement of parts may be resorted to without departing from the character of the invention or the scope of the appended claims.

We claim:

1. In a protective circuit for a load to be connected to a polyphase source, which circuit has: magnetic switch means adapted for connecting and disconnecting such load with and from such polyphase source; a starting switch; a control relay with a coil and operating contacts for energizing said magnetic switch means; an initiating circuit that presents a starting voltage across its output upon operation of said starting switch; and a transformer having a plurality of primary windings for insertion in the lines of the polyphase source, a secondary winding, and a saturable magnetic frame having a magnetic path for each primary winding which inductively links the associated primary winding with the secondary winding and which saturates at the peak normal current values of the associated primary winding whereby harmonic voltages are induced in the secondary winding; the combination therewith of: and inductance; a capacitance; a full wave rectifier with its output connected to said control relay coil; first circuit connections joining the output of said initiating circuit across the input of said rectifier; and second circuit connections joining said inductance and capacitance in series with said transformer secondary winding and the input of said rectifier; said inductance and capacitance being tuned for optimum current flow from said transformer secondary winding during normal operation in which said harmonic voltages are induced in said transformer secondary winding.

2. In a protective circuit for a load to be connected to a polyphase source, which circuit has: magnetic switch means adapted for connecting and disconnecting such a load with and from such a polyphase source; a control relay with a coil and contacts for operating said magnetic switch means; an initiating circuit for supplying a starting voltage; and a transformer having a plurality of primary windings for insertion in the lines of the polyphase source, a secondary winding, and a saturable magnetic frame having a magnetic path for each primary winding which inductively links the associated primary winding with the secondary winding and which saturates at the peak normal current values of the associated primary winding whereby a harmonic frequency voltage is induced in said secondary winding that is a frequency substantially the primary frequency times the number of primary windings; the combination therewith of: a rectifier having connections with said control relay coil for supplying undirectional current to the coil; a starting voltage transformer with its primary winding in said initiating circuit and with its secondary winding joined to said rectifier for initial energization of said control relay coil; circuit connections joining said inductance, capacitance and transformer secondary winding in series with one another and joining these serially connected elements to said rectifier, whereby rectified current from said transformer secondary may be fed to said control relay coil; said inductance and capacitance being tuned for series resonance at said harmonic frequency generated in said transformer secondary winding.

References Cited in the file of this patent

UNITED STATES PATENTS

| | | |
|---|---|---|
| 1,360,462 | Stoekle | Nov. 30, 1920 |
| 2,122,107 | Meller | June 28, 1938 |
| 2,384,375 | Hayward | Sept. 4, 1945 |
| 2,839,709 | Baumgartner | June 17, 1958 |
| 2,861,223 | Seller | Nov. 18, 1958 |
| 2,876,405 | Diederich | Mar. 3, 1959 |
| 2,938,150 | Kniel | May 24, 1960 |

FOREIGN PATENTS

| | | |
|---|---|---|
| 718,815 | Great Britain | Nov. 24, 1954 |
| 742,189 | Great Britain | Dec. 21, 1955 |